(12) United States Patent
Kronestedt et al.

(10) Patent No.: US 8,219,105 B2
(45) Date of Patent: Jul. 10, 2012

(54) RADIO RESOURCE ALLOCATION TO REDUCE UPLINK INTERFERENCE

(75) Inventors: Fredric Kronestedt, Ekero (SE); Anette Borg, Stockholm (SE); Lars Näslund, Solna (SE)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 540 days.

(21) Appl. No.: 12/430,393

(22) Filed: Apr. 27, 2009

(65) Prior Publication Data
US 2010/0081442 A1 Apr. 1, 2010

Related U.S. Application Data

(60) Provisional application No. 61/101,807, filed on Oct. 1, 2008.

(51) Int. Cl.
*H04W 72/00* (2009.01)
*H04W 4/00* (2009.01)
*H04B 1/00* (2006.01)
*H04B 15/00* (2006.01)
*H04B 7/00* (2006.01)

(52) U.S. Cl. ............ 455/450; 455/63.1; 455/452.2; 455/509; 455/513; 370/329

(58) Field of Classification Search .......... 455/63.1, 455/450, 452.2, 509, 513; 370/329
See application file for complete search history.

(56) References Cited

U.S. PATENT DOCUMENTS

| | | | |
|---|---|---|---|
| 6,466,793 B1 * | 10/2002 | Wallstedt et al. | 455/450 |
| 6,657,982 B1 * | 12/2003 | Fong et al. | 370/336 |
| 6,999,776 B2 * | 2/2006 | Ogino et al. | 455/456.1 |
| 2001/0014608 A1 * | 8/2001 | Backstrom et al. | 455/450 |
| 2007/0047569 A1 * | 3/2007 | Das et al. | 370/443 |
| 2007/0230428 A1 | 10/2007 | Seki et al. | |
| 2007/0249363 A1 | 10/2007 | Amalfitano et al. | |
| 2008/0146231 A1 | 6/2008 | Huang et al. | |

FOREIGN PATENT DOCUMENTS

GB 2 444 996 A 6/2008

OTHER PUBLICATIONS

Kurner, T.; Meier, A.; , "Prediction of outdoor and outdoor-to-indoor coverage in urban areas at 1.8 GHz," Selected Areas in Communications, IEEE Journal on , vol. 20, No. 3, pp. 496-506, Apr. 2002 doi: 10.1109/49.995508 URL: http://ieeexplore.ieee.org/stamp/stamp.jsp?tp=&arnumber=995508&isnumber=21480.*

International Search Report and Written Opinion mailed Sep. 29, 2009 in corresponding PCT application PCT/SE2009/050448.

3GPP TS 36.211 V8.5.0, Technical Specification Group Radio Access Network; "Evolved Universal Terrestrial Radio Access (E-UTRA); Physical Channels and Modulation" (Release 8) (Dec. 2008).

\* cited by examiner

*Primary Examiner* — Dwayne Bost
*Assistant Examiner* — Larry Sternbane
(74) *Attorney, Agent, or Firm* — Nixon & Vanderhye, P.C.

(57) ABSTRACT

A network node (28) of a radio access network (20) comprises a scheduler (40) configured to provide an allocation of an uplink resource to an indoor wireless terminal (30) in communication over an air interface with the radio access network. The allocation of the network node is made in coordinated manner with resource allocation of another network node whereby any interference by reason of allocation of same uplink resource must be with another indoor wireless terminal served by the another network node. Preferably the another network node is a network node which serves a neighboring or adjacent cell.

28 Claims, 13 Drawing Sheets

UL SIR: 1-2 dB gain with ideal pc 4-5 dB gain with no pc 1-reuse, 500m site-to-site
50% indoor probability
22 dB indoor loss
Pathloss frequency dependency not included, only interference gains

RADIO RESOURCE ALLOCATION TO REDUCE UPLINK INTERFERENCE

This application claims the priority and benefit of U.S. Patent Application 61/101,807, filed Oct. 1, 2008, entitled "Radio Resource Allocation", which is incorporated herein by reference in its entirety.

TECHNICAL FIELD

This invention pertains to mobile radio communications, and particularly to reducing interference for uplink communications from a wireless terminal to a network node.

BACKGROUND

In a typical cellular radio system, wireless terminals (also known as mobile stations and/or user equipment units (UEs)) communicate via a radio access network (RAN) to one or more core networks. The wireless terminals can be mobile stations or user equipment units (UE) such as mobile telephones ("cellular" telephones) and laptops with wireless capability (e.g., mobile termination), and thus can be, for example, portable, pocket, hand-held, computer-included, or car-mounted mobile devices which communicate voice and/or data with the radio access network.

The radio access network (RAN) covers a geographical area which is divided into cell areas, with each cell area being served by a base station, e.g., a radio base station (RBS), which in some networks is also called "NodeB" or "B node". A cell is a geographical area where radio coverage is provided by the radio base station equipment at a base station site. Each cell is identified by an identity within the local radio area, which is broadcast in the cell. The base stations communicate over the air interface operating on radio frequencies with the user equipment units (UE) within range of the base stations.

In some versions of the radio access network, several base stations are typically connected (e.g., by landlines or microwave) to a radio network controller (RNC). The radio network controller, also sometimes termed a base station controller (BSC), supervises and coordinates various activities of the plural base stations connected thereto. The radio network controllers are typically connected to one or more core networks.

The Universal Mobile Telecommunications System (UMTS) is a third generation mobile communication system, which evolved from the Global System for Mobile Communications (GSM), and is intended to provide improved mobile communication services based on Wideband Code Division Multiple Access (WCDMA) access technology. UTRAN, short for UMTS Terrestrial Radio Access Network, is a collective term for the Node B's and Radio Network Controllers which make up the UMTS radio access network. Thus, UTRAN is essentially a radio access network using wideband code division multiple access for user equipment units (UEs).

In a forum known as the Third Generation Partnership Project (3GPP), telecommunications suppliers propose and agree upon standards for third generation networks and UTRAN specifically, and investigate enhanced data rate and radio capacity. The Third Generation Partnership Project (3GPP) has undertaken to evolve further the UTRAN and GSM based radio access network technologies. In this regard, specifications for the Evolved Universal Terrestrial Radio Access Network (E-UTRAN) are ongoing within the 3rd Generation Partnership Project (3GPP). The Evolved Universal Terrestrial Radio Access Network (E-UTRAN) comprises the Long Term Evolution (LTE) and System Architecture Evolution (SAE).

Long Term Evolution (LTE) is a variant of a 3GPP radio access technology wherein the radio base station nodes are connected directly to a core network rather than to radio network controller (RNC) nodes. In general, in LTE the functions of a radio network controller (RNC) node are performed by the radio base stations nodes. As such, the radio access network (RAN) of an LTE system has an essentially "flat" architecture comprising radio base station nodes without reporting to radio network controller (RNC) nodes.

The Long Term Evolution (LTE) standard is based on multi-carrier based radio access schemes such as Orthogonal Frequency-Division Multiplexing (OFDM) in the downlink and SC-FDMA in the uplink. The Orthogonal FDM's (OFDM) spread spectrum technique distributes the data over a large number of carriers that are spaced apart at precise frequencies. This spacing provides the "orthogonality" in this technique which prevents the demodulators from seeing frequencies other than their own. The benefits of OFDM are high spectral efficiency, resiliency to RF interference, and lower multi-path distortion.

In LTE a frame having both downlink portion(s) and uplink portion(s) is communicated between the base station and the wireless terminal. Each LTE frame can comprise plural subframes. In the time domain, each LTE subframe (having 1 ms duration) is divided into two slots, each slot being 0.5 ms in duration. The transmitted signal in each slot is described by a resource grid of subcarriers and symbols. Each element in the resource grid is called a resource element (RE) and is uniquely defined by an index pair (k,l) in a slot (where k and l are the indices in the frequency and time domain, respectively). In other words, one symbol on one sub-carrier is a resource element (RE). Each symbol thus comprises a number of sub-carriers in the frequency domain, depending on the channel bandwidth and configuration. The smallest time-frequency resource supported by the standard today is a set of plural subcarriers and plural symbols (e.g., plural resource elements (RE)) and is called a resource block (RB) (e.g. 12 subcarriers and 7 symbols) See, e.g., 3GPP TS 36.211 V8.5.0 (2008-12) section 5.2.

In Long Term Evolution (LTE) no dedicated data channels are used, instead shared channel resources are used in both downlink and uplink. These shared resources, e.g., the downlink shared channel (DL-SCH) and the uplink shared channel (UL-SCH) are each controlled by one or more schedulers that assign(s) different parts of the downlink and uplink shared channels to different UEs for reception and transmission respectively. The assignments for the downlink shared channel (DL-SCH) and the uplink shared channel (UL-SCH) are transmitted in a control region covering a few OFDM symbols in the beginning of each downlink subframe.

FIG. 1 illustrates some of the foregoing in simplified fashion by showing that, in Long Term Evolution (LTE), the total bandwidth of the carrier is divided into several sub-bands and the time domain is divided into time slots. This gives a grid of time-frequency blocks, e.g., the aforementioned resource blocks (RB). In each time slot, users are scheduled to one or several sub-bands. FIG. 2 shows users scheduled to different sub-bands in one time slot. In the uplink, when plural sub-bands are scheduled for a same user, the plural sub-bands have to be consecutive. Users in adjacent and neighboring cells can be allocated to the same sub-band in the same time slot, and therefore can interfere with each other.

The nature and number of mobile broadband communications are greatly increasing. Moreover, mobile broadband communications largely happens indoors. By "indoors" is meant that wireless terminals which participate in the mobile broadband communications, though wireless, are typically situated within some type of structure (e.g., building or vehicle) during at least a portion of the broadband session. For example, most users surf the internet from their personal computer (PC) or laptop, which generally are located indoors at the time of the communications session. It is natural that these types of wireless terminals be in homes and/or buildings. Some network operators have reported that up to 50-80% of their users are indoor users.

In the uplink, the operating power for a wireless terminal (e.g., user equipment unit (UE)) is limited from the outset (e.g., is not as great as downlink transmission power from the base station). The relatively low power signal emanating from an indoor wireless terminal is reduced further by a loss factor occasioned by the structure or building in which an indoor wireless terminal is located.

To make matters worse, the signal emanating from an indoor wireless terminal can be interfered with by other users. If the other users are outdoor users, those outdoor users may have stronger signal since, unlike the indoor user, the outdoor user signal is not reduced by building loss.

In view of factors such as those mentioned above, the indoor user could well have poor performance, particularly in the uplink. In the downlink, the problem is typically not as severe. In the downlink the base station has more power and the interference situation is different, since downlink interference is shielded by the building for the indoor user.

Thus, due to such factors as high building losses, indoor users have generally higher pathloss than outdoor users in the uplink (UL) to the serving cell and probably also higher pathloss to surrounding cells. Therefore the indoor users will create less interference than outdoor users in the uplink.

In existing solutions, indoor and outdoor users are scheduled randomly in the frequency- and time-domain. It is therefore entirely possible that an indoor user can be scheduled on a same time slot and on a same sub-band as an outdoor user. In such case, the indoor users will experience a high interference level which will possibly give an undesirably low bitrate.

SUMMARY

In one of its aspects the technology disclosed herein concerns a network node of a radio access network. The network node comprises a scheduler configured to provide an allocation of an uplink resource to an indoor wireless terminal in communication over an air interface with the radio access network. The allocation of the network node is made in coordinated manner with resource allocation of another network node whereby any interference by reason of allocation of same uplink resource must be with another indoor wireless terminal served by the another network node. Preferably the another network node is a network node which serves a neighboring or adjacent cell.

In an example embodiment, the scheduler is configured to provide a first set of uplink resources to the indoor wireless terminal and a second set of resources to other wireless terminals. For example, in an example embodiment comprising multi (frequency carrier) band operation, the scheduler can be configured to allocate a first frequency carrier to indoor wireless terminals and a second frequency carrier to other wireless terminals. In another example embodiment, with respect to a scheduling period the scheduler is configured to provide an allocation of at least one resource block(s) of a resource grid of time-frequency resources (e.g., comprising a frame) for uplink transmission from the wireless terminal to the network node over the radio interface. That is, the scheduler can be configured to allocate a first portion of the grid to indoor wireless terminals and a second portion of the grid to other wireless terminals.

The scheduler can be configured to provide an exception to its normal rule and thereby be permitted to allocate resources of the second set to the indoor wireless terminal or to allocate resources of the first set to the other wireless terminals upon occurrence of a predetermined circumstance, e.g., when strict application of the resource delineation between indoor and other users may preclude or prevent service to a user.

In one example implementation, the scheduler is configured to allocate resources to the indoor wireless terminals in a first direction from a first edge of a resource grid and to allocate resources to the other wireless terminals in an opposite direction from an opposite edge of the resource grid. In another example implementation, the scheduler is configured to allocate resources to the indoor wireless terminals in a first direction from a first carrier frequency edge of the grid and to allocate resources to the other wireless terminals in an opposite direction from an opposite carrier frequency edge of the grid. In another example implementation, the scheduler is configured to allocate resources to the indoor wireless terminals in a first direction from a first symbol (e.g., time slot) edge of the grid and to allocate resources to the other wireless terminals in a second direction from another symbol (e.g., time slot) edge of the grid. In another example implementation, the scheduler is configured to allocate resources to the indoor wireless terminals in a first direction from a first corner of the grid and to allocate resources to the other wireless terminals in a second direction from another corner of the grid.

In another example embodiment the network node further comprises a detector configured to determine whether a specified wireless terminal in communication over an air interface with the network node is an indoor wireless terminal. In some example embodiments the detector is configured to use radio measurements to determine whether the specified wireless terminal is the indoor wireless terminal. For example, in some example implementations the detector is configured to use at least one of signal strength (path loss); signal quality (uplink and/or downlink bitrate, average bitrate, bit error rate (BER), block error rate (BLER), or channel quality indicator (CQI)); power used; estimation of (travel) speed of the wireless terminal; number of reported neighbor cells; and, timing advance (distance to base station) to determine whether the specified wireless terminal is the indoor wireless terminal.

In another of its aspects the technology disclosed herein concerns a method of operating a network node. The method comprises providing an allocation of an uplink resource to an indoor wireless terminal in communication over an air interface with the network node in coordinated manner with resource allocation of another network node whereby any interference by reason of allocation of same uplink resource must be with another indoor wireless terminal served by the another network node.

In an example embodiment the method further comprises providing a first set of uplink resources for the indoor wireless terminal and a second set of resources for other wireless terminals. For example, in an example embodiment involving multi (frequency carrier) band operation the method further comprises providing a first frequency carrier (e.g., frequency band) to indoor wireless terminals and a second and different frequency carrier (e.g., frequency band) to other wireless terminals. In another example embodiment the method further comprises providing an allocation of at least one resource block(s) of a scheduling period of a resource grid of time-frequency resources for uplink transmission from the wireless terminal to the network node over the radio interface, e.g., allocating a first portion of the grid to indoor wireless terminals and a second portion of the grid to other wireless terminals.

In an example implementation, the method comprises allocating resources to the indoor wireless terminals in a first direction from a first edge of the grid and allocating resources to the other wireless terminals in an opposite direction from an opposite edge of the grid. In another example implementation the method comprises allocating resources to the indoor wireless terminals in a first direction from a first carrier frequency edge of the grid and to allocate resources to the other wireless terminals in an opposite direction from an opposite carrier frequency edge of the grid. In another example implementation the method comprises allocating resources to the indoor wireless terminals in a first direction from a first symbol (e.g., time slot) edge of the grid and allocating resources to the other wireless terminals in a second direction from another symbol (e.g., time slot) edge of the grid. In another example implementation the method comprises allocating the resources to the indoor wireless terminals in a first direction from a first corner of the grid and to allocate resources to the other wireless terminals in a second direction from another corner of the grid.

In another example embodiment the method comprises determining whether a specified wireless terminal in communication over an air interface with the network node is an indoor wireless terminal. For example, the method can comprise using radio measurements to determine whether the specified wireless terminal is the indoor wireless terminal. For example, in some example implementations the detector is configured to use at least one of signal strength (path loss); signal quality (uplink and/or downlink bitrate, average bitrate, bit error rate (BER), block error rate (BLER), or channel quality indicator (CQI)); power used; estimation of (travel) speed of the wireless terminal; number of reported neighbor cells; and, timing advance (distance to base station) to determine whether the specified wireless terminal is the indoor wireless terminal.

In another of its aspects the technology disclosed herein concerns a method of operating a radio access network comprising a first network node and a second network node. The method basically comprises the first network node providing an allocation of an uplink resource to a first indoor wireless terminal in communication over an air interface with the first network node; and the second network node ensuring that a second wireless terminal is also an indoor wireless terminal before allocating a same uplink resource to the second wireless terminal as did the first network node to the first wireless terminal.

In another of its aspects the technology disclosed herein concerns a method of operating a radio access network wherein both the first network node and the second network node make allocations of uplink resources whereby wireless terminals which are indoor wireless terminals are assigned uplink resources which are in a first portion of a frequency-time grid. Similarly, the both the first network node and the second network node make allocations of uplink resources whereby wireless terminals which are not indoor wireless terminals are assigned uplink resources which are in a second portion of a frequency-time grid. The allocations require that any interference experienced by an indoor wireless terminal by reason of allocation of same uplink resource be with another indoor wireless terminal.

BRIEF DESCRIPTION OF THE DRAWINGS

The foregoing and other objects, features, and advantages of the invention will be apparent from the following more particular description of preferred embodiments as illustrated in the accompanying drawings in which reference characters refer to the same parts throughout the various views. The drawings are not necessarily to scale, emphasis instead being placed upon illustrating the principles of the invention.

DETAILED DESCRIPTION

In the following description, for purposes of explanation and not limitation, specific details are set forth such as particular architectures, interfaces, techniques, etc. in order to provide a thorough understanding of the present invention. However, it will be apparent to those skilled in the art that the present invention may be practiced in other embodiments that depart from these specific details. That is, those skilled in the art will be able to devise various arrangements which, although not explicitly described or shown herein, embody the principles of the invention and are included within its spirit and scope. In some instances, detailed descriptions of well-known devices, circuits, and methods are omitted so as not to obscure the description of the present invention with unnecessary detail. All statements herein reciting principles, aspects, and embodiments of the invention, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

Thus, for example, it will be appreciated by those skilled in the art that block diagrams herein can represent conceptual views of illustrative circuitry embodying the principles of the technology. Similarly, it will be appreciated that any flow charts, state transition diagrams, pseudocode, and the like represent various processes which may be substantially represented in computer readable medium and so executed by a computer or processor, whether or not such computer or processor is explicitly shown.

The functions of the various elements including functional blocks labeled or described as "processors" or "controllers" may be provided through the use of dedicated hardware as well as hardware capable of executing software in association with appropriate software. When provided by a processor, the functions may be provided by a single dedicated processor, by a single shared processor, or by a plurality of individual processors, some of which may be shared or distributed. Moreover, explicit use of the term "processor" or "controller" should not be construed to refer exclusively to hardware capable of executing software, and may include, without limitation, digital signal processor (DSP) hardware, read only memory (ROM) for storing software, random access memory (RAM), and non-volatile storage.

Figure 1:
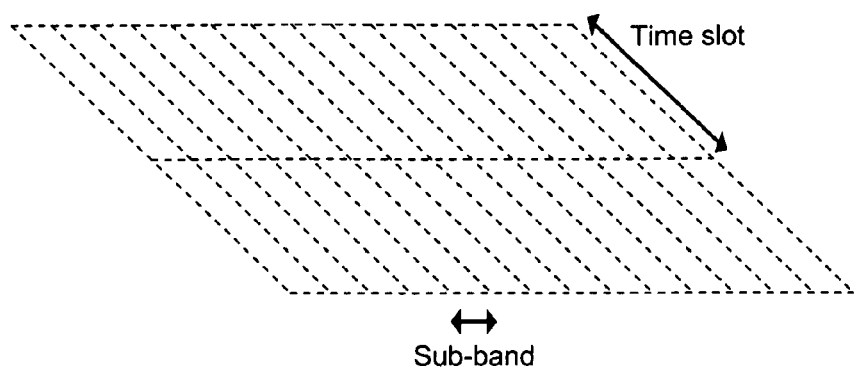
FIG. 1 is a diagrammatic view of a resource grid of time frequency blocks (RB) in Long Term Evolution (LTE).
Figure 2:
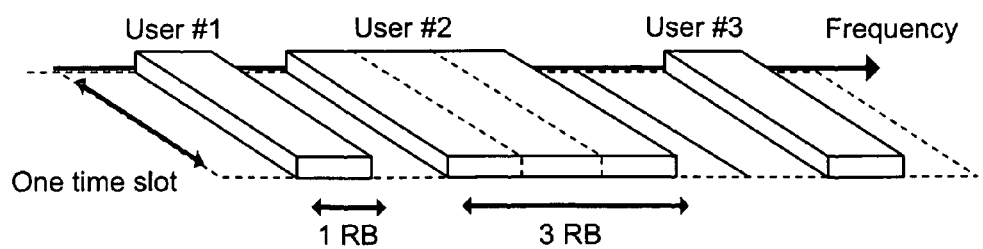
FIG. 2 is a diagrammatic view showing users scheduled to different sub-bands in one symbol (e.g., time slot).
Figure 3:
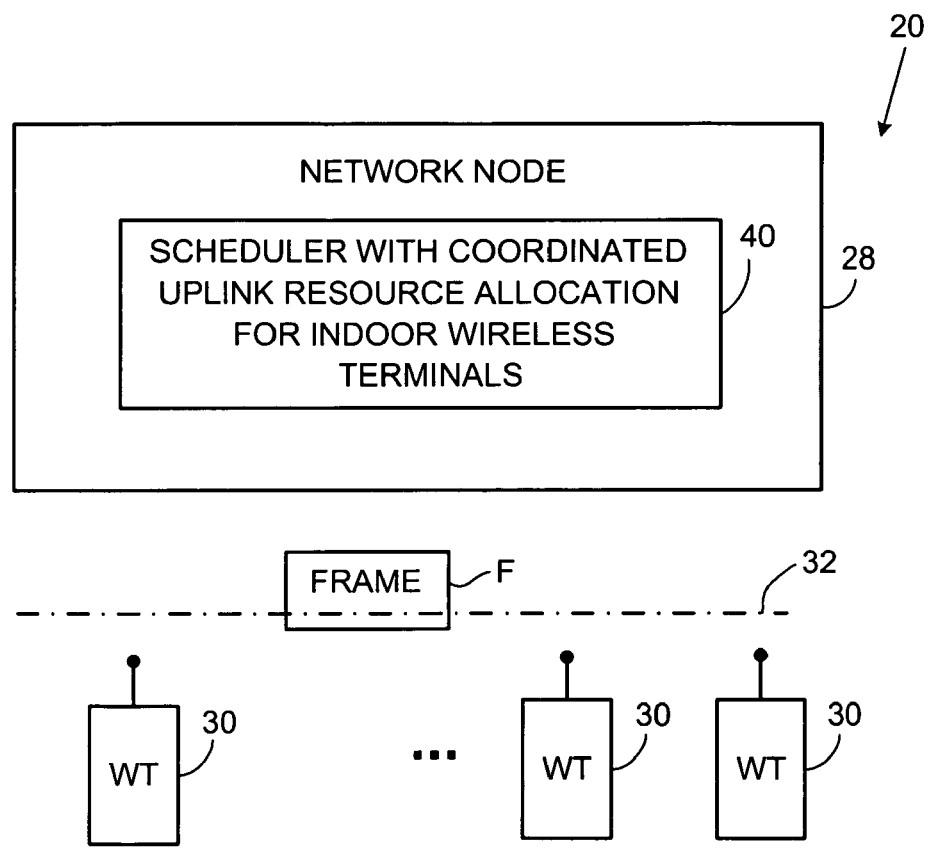
FIG. 3 is a schematic view of portions of a radio access network including a network node of an example embodiment comprising an indoor smart scheduler.

FIG. 3 shows portions of radio access network (RAN) 20 of a telecommunications system, and particularly a network node 28 which is responsible for scheduling of resources utilized by and/or involved in communications with plural wireless terminals (WT) 30 over a radio or air interface 32. Scheduling is a process to allocate radio resources to users served by each base station. The communications typically involve frames of information, a representative frame F being shown in FIG. 3. In an example embodiment the network node 28 takes the form of a base station or "eNodeB" which communicates with the plural wireless terminals 30 or over the radio or air interface 32. It will be appreciated that the radio access network (RAN) typically comprises numerous other nodes, such as other base station nodes. Only one network node 28 is shown in FIG. 3 for sake of simplicity, and only selected elements or functional units which are germane to the technology disclosed herein.

As shown in FIG. 3, the network node 28 includes a scheduler 40 that has coordinated uplink resource scheduling for indoor wireless terminals. The function performed by scheduler 40 is typically performed at a base station or eNodeB, but in some embodiments and networks can be performed at another node of the radio access network. Therefore, the term "network node" is used generically to refer to any node of a radio access network at which the scheduler 40 is or can be located.

Scheduler 40 has coordinated uplink resource scheduling for indoor wireless terminals. That is, scheduler 40 allocates resources for frame F in coordinated manner with resource allocation of another network node whereby any interference occurring by reason of allocation of same uplink resource must be with another indoor wireless terminal served by the another network node. Accordingly, the scheduler of the network node 28 is herein also referred to as indoor smart scheduler 40.

Figure 4A:
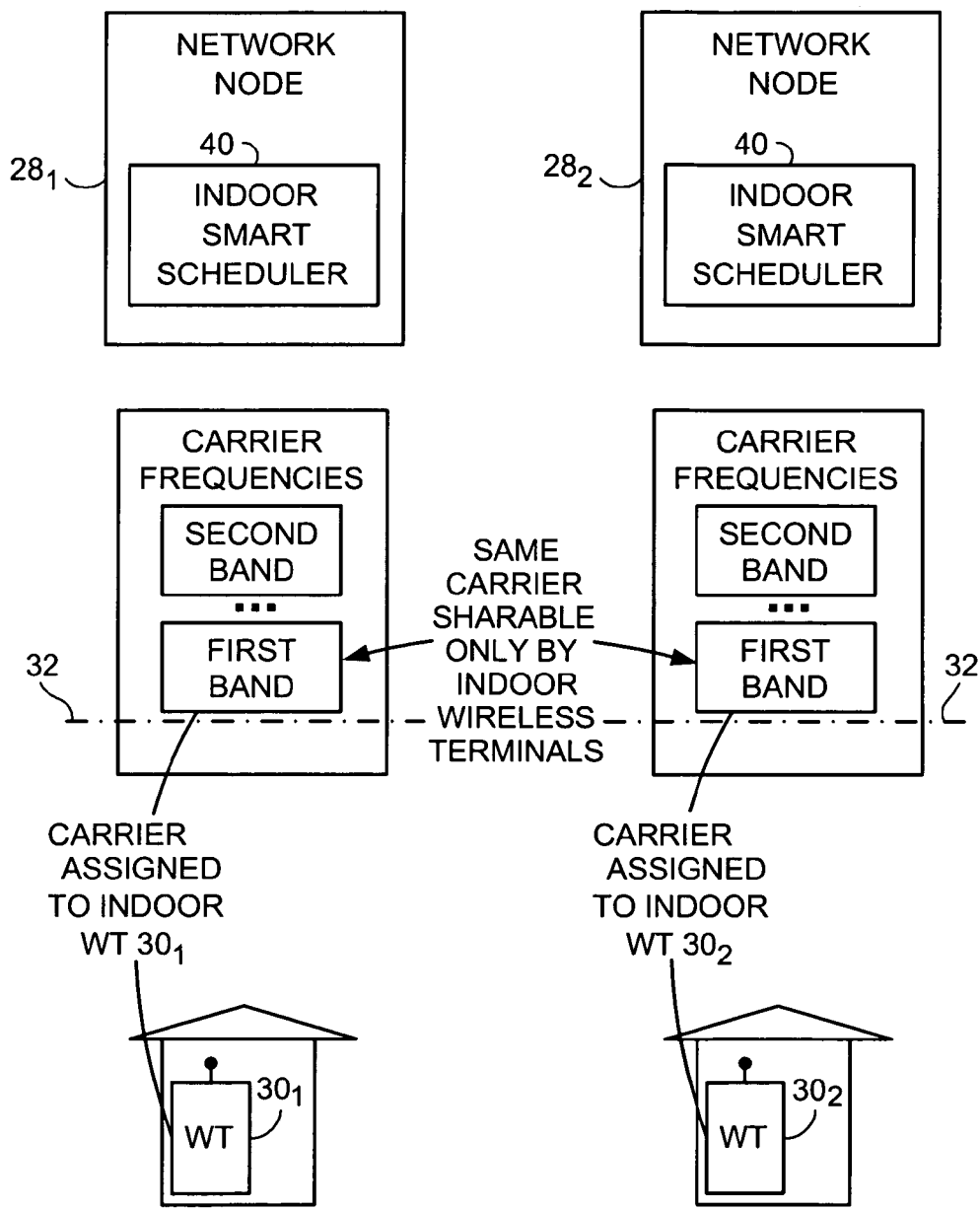
FIG. 4A is a diagrammatic view showing, if a carrier is allocated to an indoor wireless terminal, the same carrier in another cell is shared only by another indoor wireless terminal.
Figure 4B:
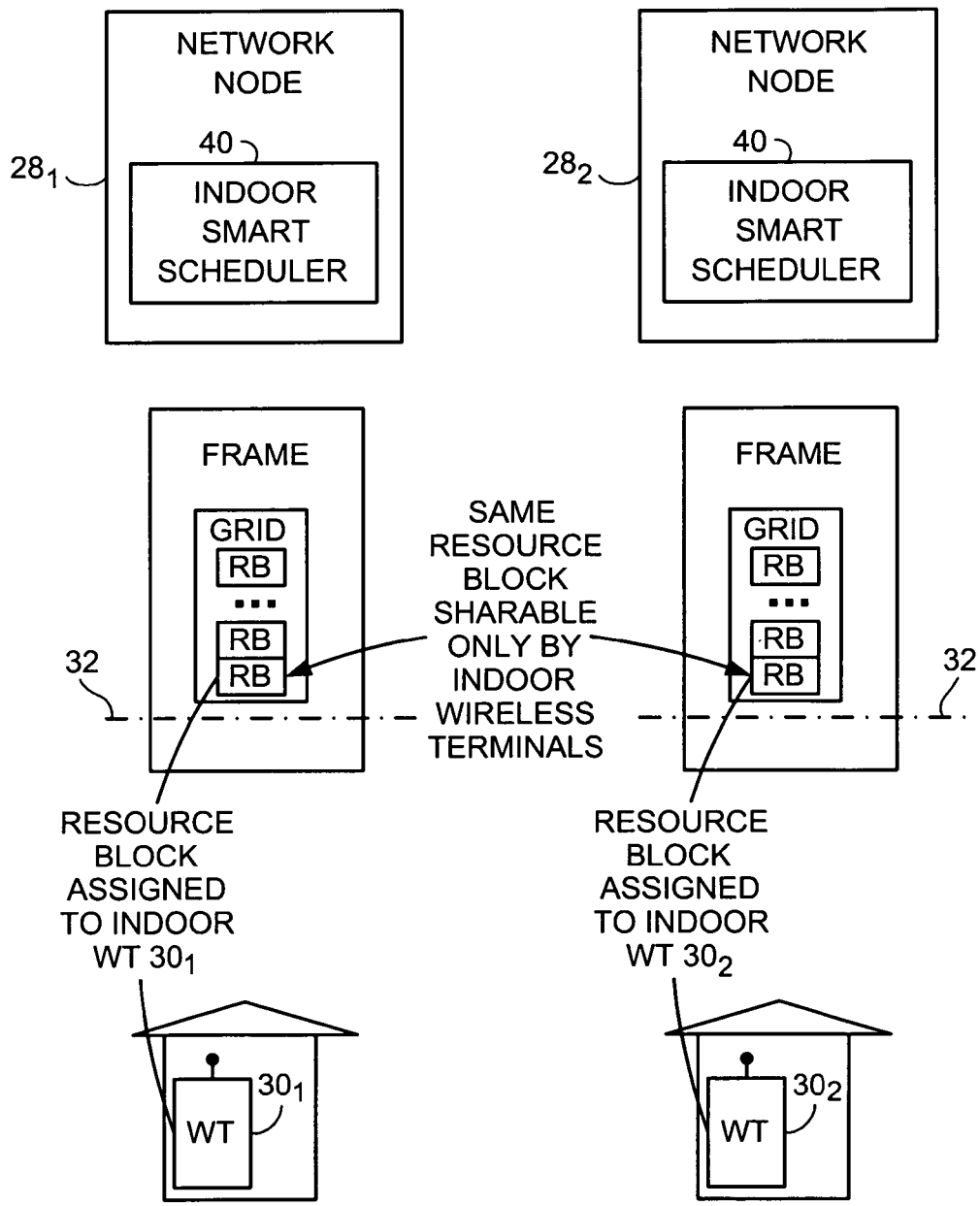
FIG. 4B is a diagrammatic view showing, if a resource block is allocated to an indoor wireless terminal, the same resource block in another cell is shared only by another indoor wireless terminal.

The foregoing and other aspects of the technology disclosed herein are illustrated by FIG. 4A and FIG. 4B, both of which show a situation in which two network nodes $28_1$ and $28_2$ both have indoor smart schedulers 40. The two network nodes $28_1$ and $28_2$ can serve or be located in adjacent or neighboring cells, and thus can be adjacent or neighboring network nodes. The two network nodes $28_1$ and $28_2$ and their indoor smart schedulers 40 are coordinated so that any uplink resource (e.g., block (RB)) which is allocated by a first network node $28_1$ to an indoor wireless terminal (e.g., wireless terminal $30_1$), if also assigned by a second network node $28_2$, is assigned to (e.g., shared with) only another indoor wireless terminal (e.g., wireless terminal $30_2$).

In the example embodiment of FIG. 4A, the indoor smart schedulers 40 of the two network nodes are configured to allocate, as the different resources, different frequency carriers in a dual or multi-band scenario. The allocation of FIG. 4A is made such that wireless terminals which are indoor wireless terminals are assigned or allocated a first frequency carrier (e.g., the first set of uplink resources) but the wireless terminals which are outdoor wireless terminals are assigned or allocated a second frequency carrier (e.g., the second set of uplink resources). It could be, for example, that a sector uses two frequency carriers, e.g., one in the 900 MHz band and the other in the 2600 MHz band. The 900 MHz carrier has better coverage due to the lower Frequency band. The sessions could hence be set up on the 900 MHz carrier. However, if it is determined that a user (e.g., a wireless terminal) is an outdoor user rather than an indoor user, the outdoor user can be allocated or moved to the 2.6 GHz carrier while the indoor user(s) remain in the 900 MHz band.

In the example embodiment of FIG. 4B, the indoor smart schedulers 40 of the two network nodes $28_1$ and $28_2$ are configured to allocate resources (e.g., resource block (RB)) in such a manner that wireless terminals which are indoor wireless terminals are assigned or allocated uplink resources which are in a first portion of a resource (and thus comprise a first set of uplink resources) but wireless terminals which are outdoor wireless terminals are assigned or allocated uplink resources which are in a second portion of the grid (and thus comprise a second set of uplink resources).

In the example situation shown in FIG. 4B, both the first network node $28_1$ and the second network node $28_2$ make allocations of uplink resources whereby wireless terminals which are indoor wireless terminals are assigned uplink resources which are in a first portion of a frequency-time grid. In the example shown in FIG. 4B, the first portion of the grid is a lower portion which includes the lowermost resource block (RB). Similarly, the both first network node $28_1$ and second network node $28_2$ make allocations of uplink resources whereby wireless terminals which are not indoor wireless terminals are assigned uplink resources which are in a second portion of a frequency-time grid. In the example shown in FIG. 4B, the second portion of the grid is an upper portion which includes the uppermost resource block (RB).

The allocations require that any interference experienced by an indoor wireless terminal by reason of allocation of same uplink resource be with another indoor wireless terminal.

The indoor smart schedulers 40 of both first network node $28_1$ and the second network node $28_2$ can be configured (e.g., pre-configured) to know which portions of the grid to use for indoor wireless terminals and which portions of the grids to be used for outdoor terminals. When the indoor smart schedulers 40 have been pre-configured, no signaling need occur between first network node $28_1$ and the second network node $28_2$ for sake of coordinating the resource allocation. In other embodiments, especially embodiments in which the resource allocation may dynamically change, the first network node $28_1$ and the second network node $28_2$ coordinate the reserving of particular parts of the grid (e.g., for indoor wireless terminals) using signaling.

Figure 5:
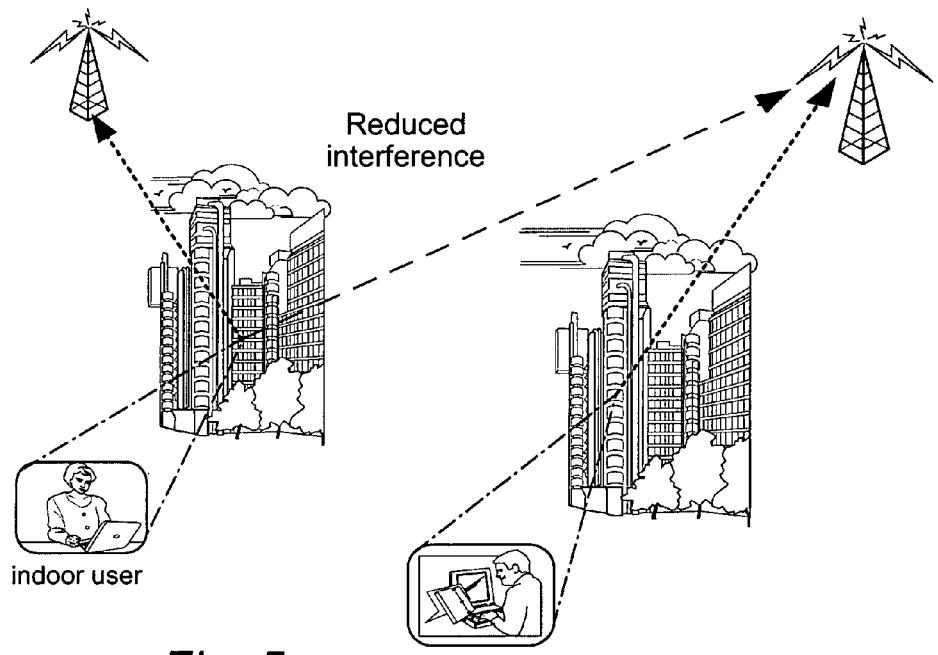
FIG. 5 is a diagrammatic view showing that coordinated sharing of resources between indoor wireless terminals reduces interference.

In view of the provision of indoor smart scheduler 40, the uplink situation for indoor users is improved. As illustrated in FIG. 4A and FIG. 4B as well as FIG. 5, indoor users are scheduled against each other making use of the high building isolation in order to reduce the uplink interference. FIG. 4A and FIG. 4B show two indoor users served by two base stations, which are allocated the same radio resources. As shown in FIG. 5, the high building loss reduces interference in the uplink for both users.

Figure 6:
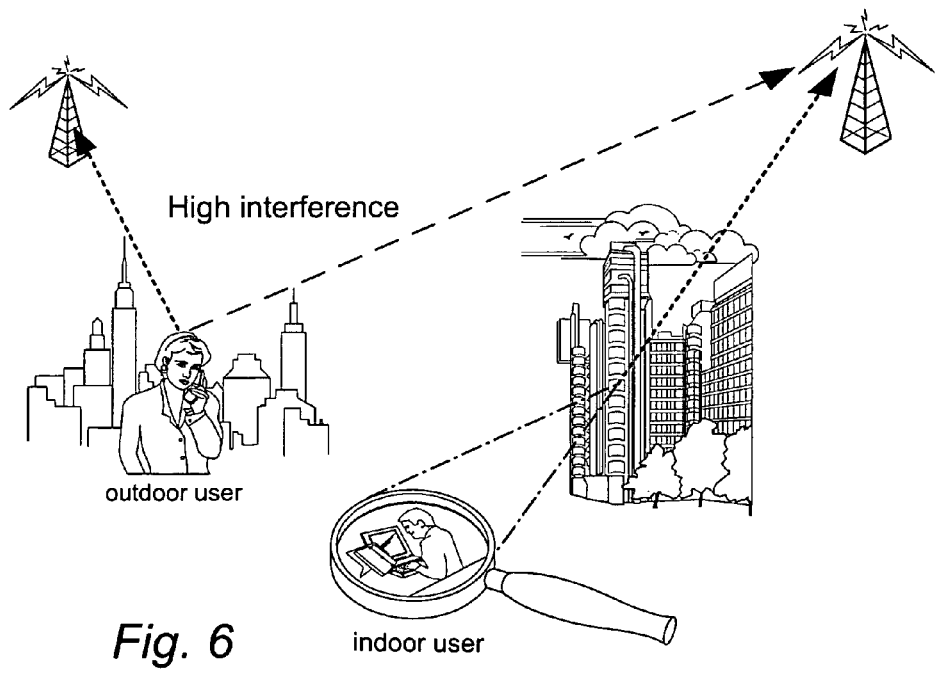
FIG. 6 is a diagrammatic view showing that non-coordinated allocation of resources increases interference for an indoor wireless terminal.

The benefit of the solution(s) provided by the technology disclosed herein is understood by a contrasting situation shown in FIG. 6. In FIG. 6 the indoor user is interfered by an outdoor user served by the second base station. Since the outdoor user is using the same resources, the outdoor user is giving high interference in the uplink for the indoor user. Fortunately, the technology described herein avoids the situation shown in FIG. 6.

Figure 7:
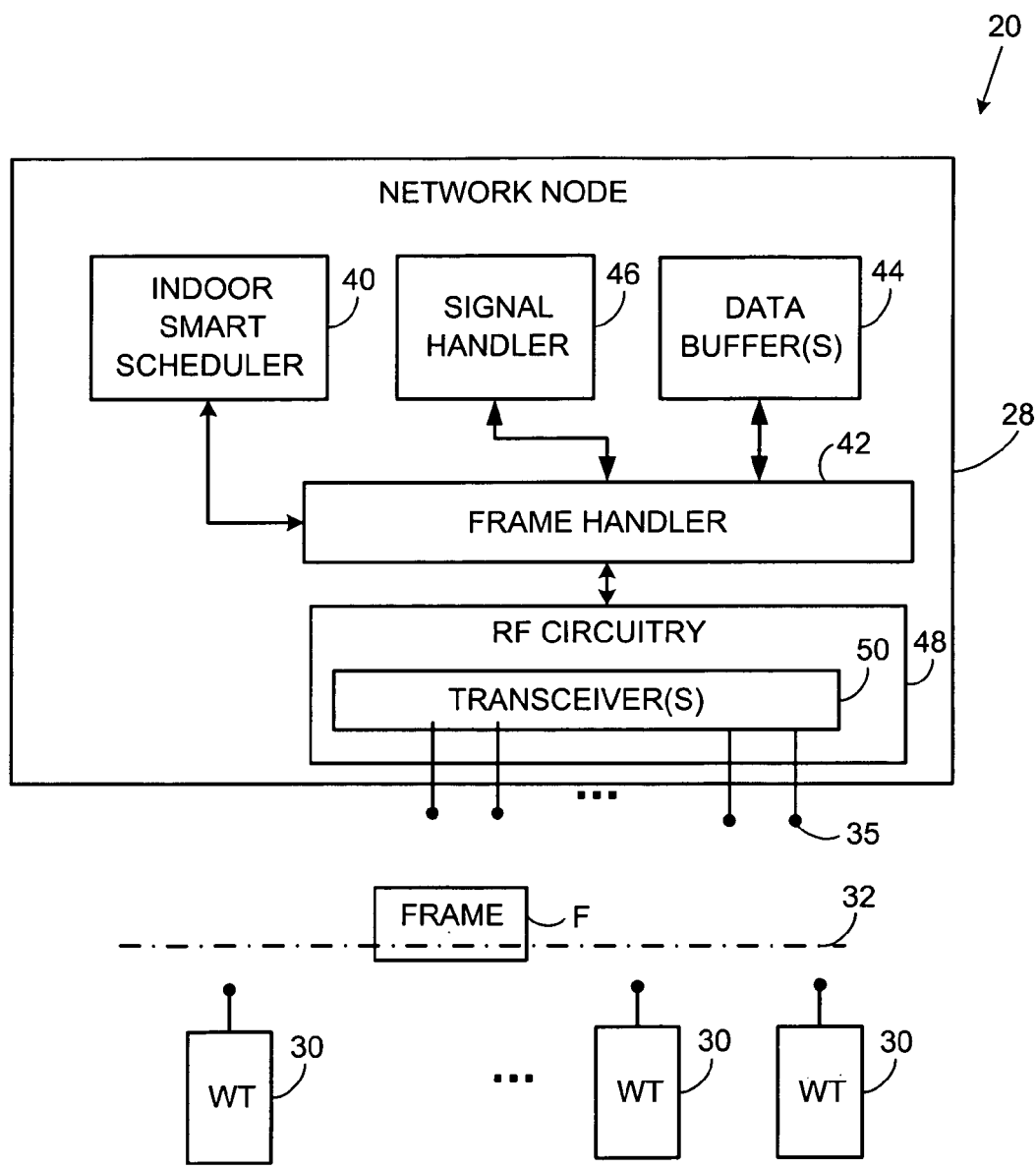
FIG. 7 is a schematic view of portions of a radio access network including a network node according to an example implementation.

FIG. 7 illustrates in more detail an example, non-exhaustive, implementation of the network node 28 of FIG. 3. In the implementation of FIG. 7 the network node 28 does happen to be a base station node, e.g., a eNodeB or BNode, for example. In addition to the indoor smart scheduler 40, the network node 28 of FIG. 7 comprises frame handler 42 which interacts with data buffer(s) 44; signal handler 46; and RF circuitry 48. On the downlink, e.g., in a direction from network node 28 to the wireless terminals 30, the frame handler 42 uses both information obtained data buffer(s) 44 and signal handler 46 to build the frame F, and inserts the information into the resource block (RB) comprising the frame F in accordance with the allocation of the resource block (RB) as directed by indoor smart scheduler 40. For example, the frame handler 42 obtains from signal handler 46 whatever information is necessary for a control portion(s) of the frame. Moreover, for each wireless terminal 30 which participates in the frame, the frame handler 42 obtained from data buffer(s) 44 inserts appropriate data into appropriate resource block (RB) of the frame. The allocation of resource block (RB) for each wireless terminal is governed by indoor smart scheduler 40. In like manner, for uplink portions of the frame, the indoor smart scheduler 40 assigns or associates resource block (RB) for each wireless terminal which participates in the frame. As mentioned above, for any such wireless terminals which are indoor terminals, the indoor smart scheduler 40 requires that the allocation of the resource block (RB) be in a controlled or coordinated manner such that use of the same resource block (RB) in an adjacent cell must also be by an indoor wireless terminal, in the manner illustrated in FIG. 4.

The RF circuitry 48 includes one or more transceiver(s) 50 which is/are configured to transmit the frame F of information for transmission over the radio interface 32. For downlink transmission to the wireless terminals 30, the transceiver(s) 50 feed plural antennae 35 which function to provide plural sub-carriers. The transceiver(s) 50 thereby transmit symbols of subframes of the frame F on the downlink (DL) on plural sub-carriers in a frequency domain.

Thus, frame handler 42 is configured to prepare or format the frame F of information for transmission by transceiver(s) 50 on a downlink to the wireless terminals 30. In an example implementation, the frame F can comprise plural subframes, with some of the subframes being downlink (DL) subframes, and others of the subframes being uplink (UL) subframes. Each subframe can be considered as a scheduling period of a resource grid of the frame. For example, frame F can be a type 2 TDD frame of the type described in 3GPP TS 36.211 V8.5.0 (2008-12) 3rd Generation Partnership Project; Technical Specification Group Radio Access Network; Evolved Universal Terrestrial Radio Access (E-UTRA); Physical Channels and Modulation (Release 8).

Figure 8:
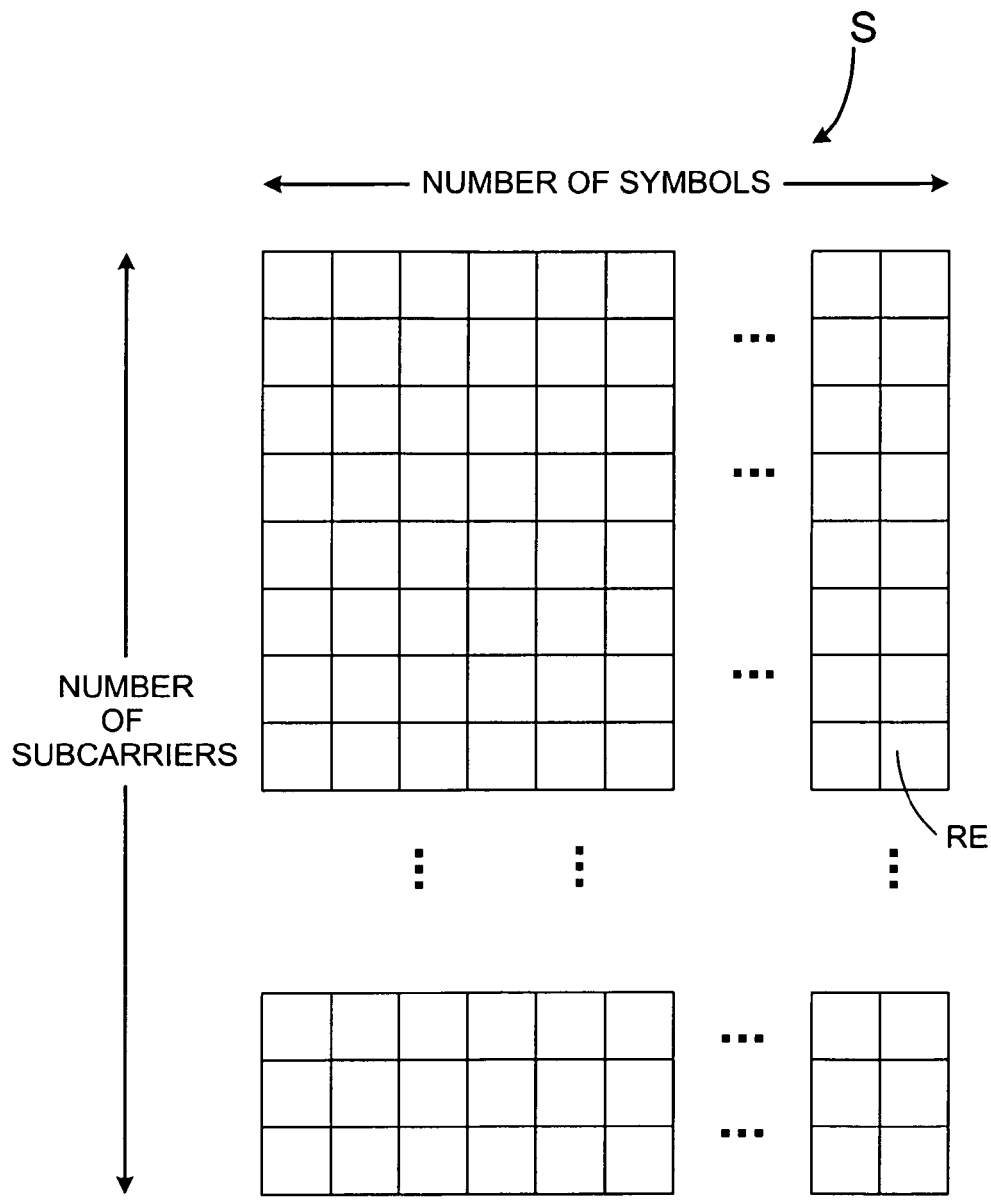
FIG. 8 is a diagrammatic view of a representative, sample subframe.

A representative, sample depiction of a subframe S according to an example implementation is shown in FIG. 8. The subframe S is illustrated in the form of a downlink resource grid comprised of resource elements (RE). Each column of the two dimensional grid of FIG. 8 represents a symbol (e.g., an OFDM symbol); each row of the grid of FIG. 8 represents a subcarrier. A resource element (RE) is the smallest time-frequency unit for downlink transmission in the subframe S. That is, one symbol on one sub-carrier in the sub-frame comprises a resource element. Typically a control channel element (CCE) has thirty six resource elements (REs). Details of an example subframe S and the resource grid are provided in 3GPP TS 36.211 V8.5.0 (2008-12) section 5.2.

In one of its aspects the technology disclosed herein concerns a method of operating a network node. As shown by block 9-1 in FIG. 9, the method comprises providing an allocation of an uplink resource to an indoor wireless terminal in communication over an air interface with the network node in coordinated manner with resource allocation of another network node whereby any interference by reason of allocation of same uplink resource must be with another indoor wireless terminal served by the another network node. The method can be implemented using scheduling rules which are introduced for use in each network node (e.g., each base station). One example rule is to allocate the resources so that indoor users should interfere with indoor users, and outdoor users should interfere with outdoor users. As explained subsequently herein, while this example rule can be applied generally, there need be no strict division of resources between indoor and outdoor users, particularly in certain situations.

Figure 9:
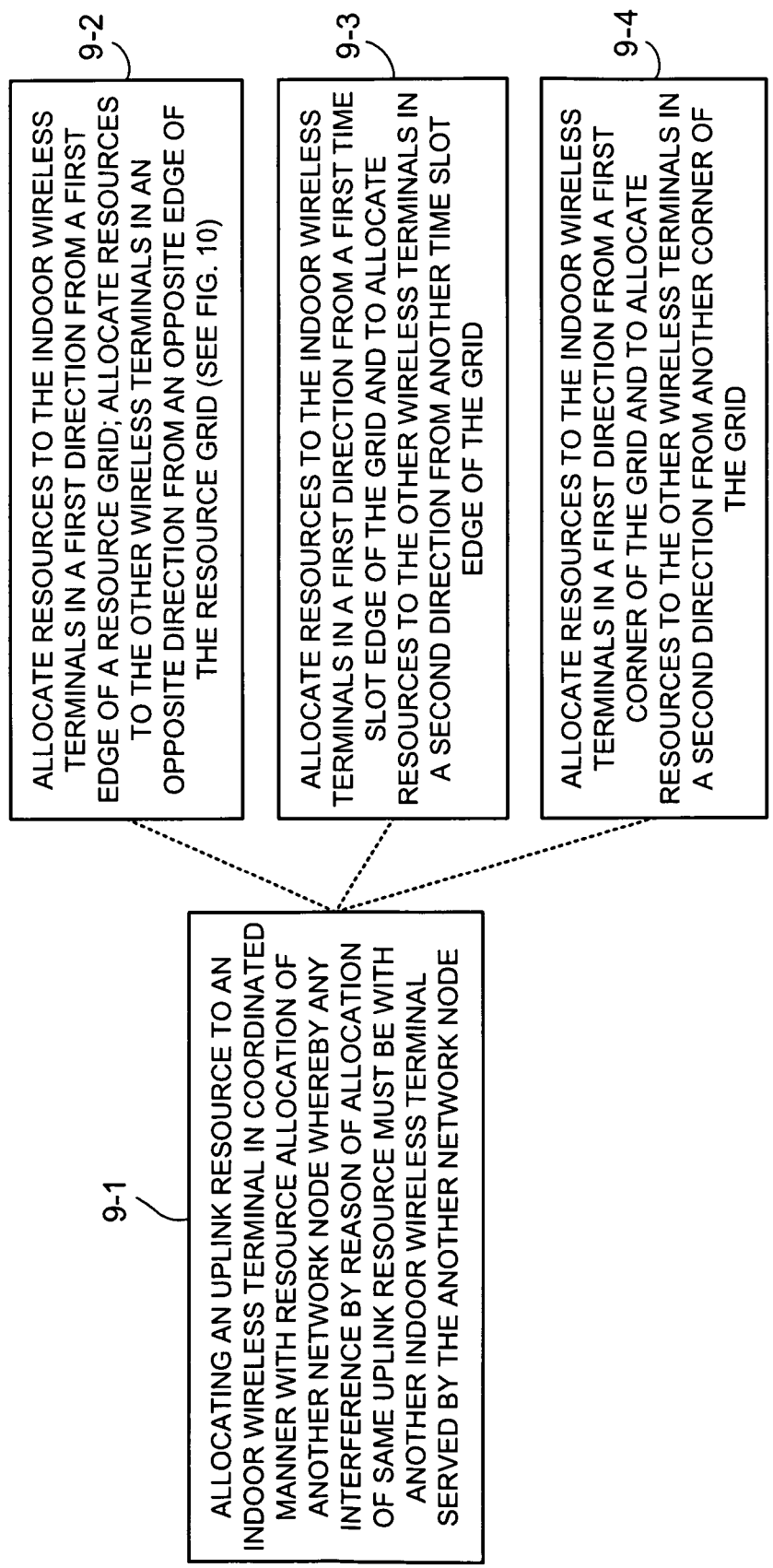
FIG. 9 is a diagrammatic view showing, e.g., alternative implementations for performing indoor smart resource allocation.
Figure 10:
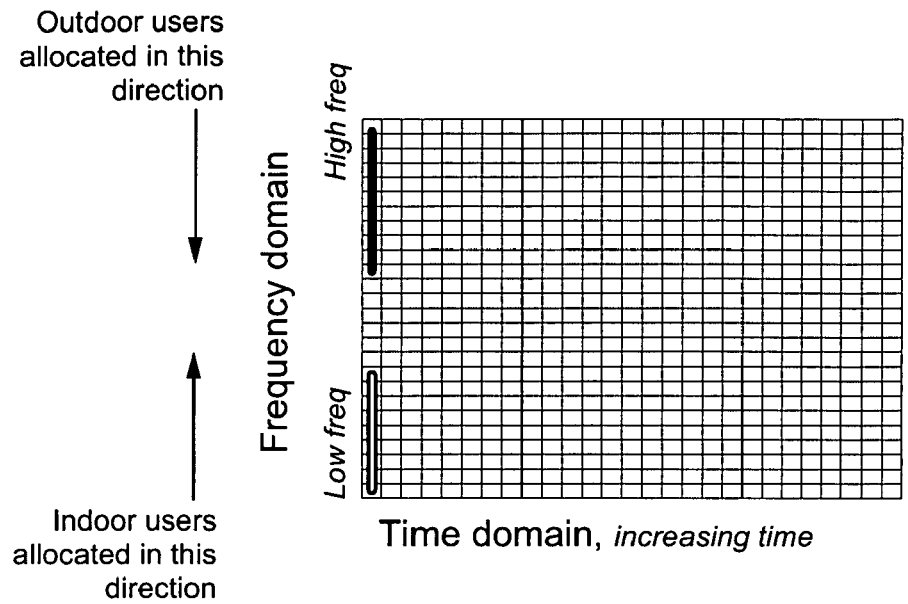
FIG. 10 is a diagrammatic view showing a resource grid and a frequency-based indoor smart resource allocation.
Figure 11:
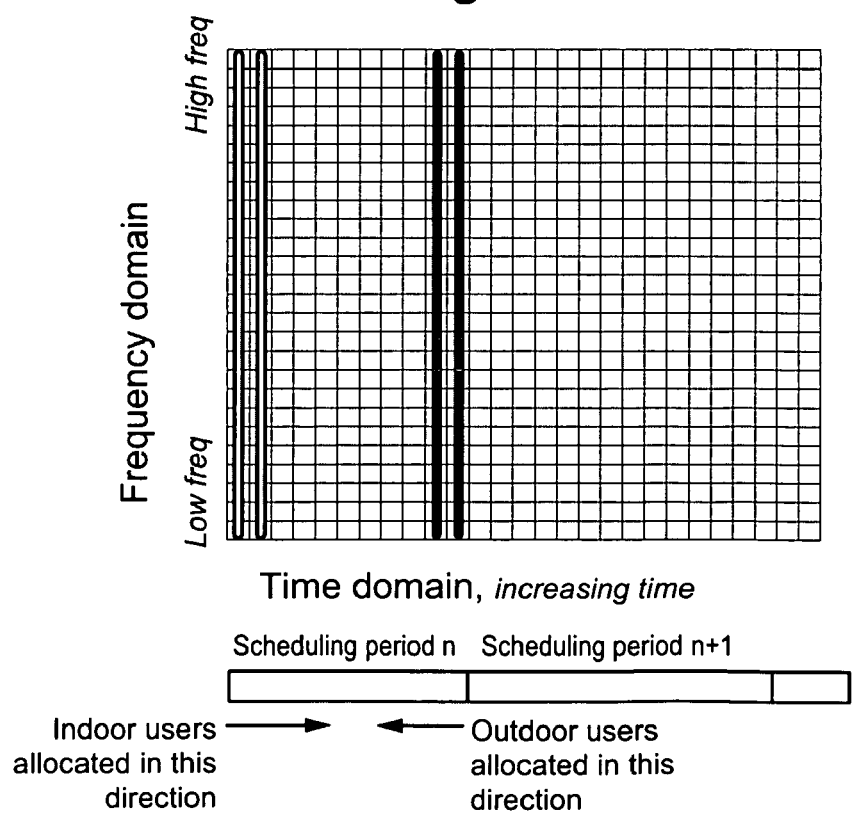
FIG. 11 is a diagrammatic view showing a resource grid and a time-based indoor smart resource allocation.
Figure 12:
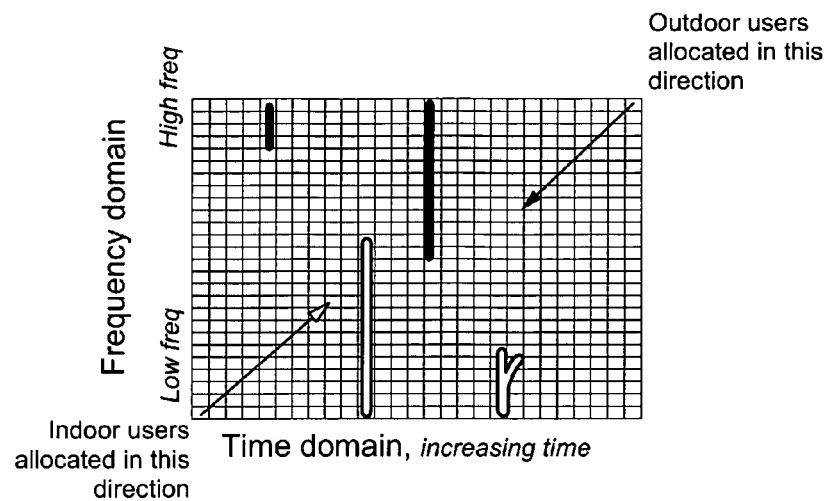
FIG. 12 is a diagrammatic view showing a resource grid and a corner-oriented indoor smart resource allocation.

FIG. 9, together with FIG. 10-FIG. 12, further illustrates various alternative ways for implementing the allocation depicted by block 9-1. The alternative ways are understood with reference to respective manners of allocating the radio resources are spread in the frequency and time domains (e.g., for LTE OFMD) as shown in FIG. 8. Each block in FIG. 8 represents a radio resource element (RE) used for carrying data in Long Term Evolution (LTE).

An example first alternative way (e.g., first rule) of implementation the indoor smart allocation of indoor smart scheduler 40 is illustrated by block 9-2 of FIG. 9 and FIG. 10. The first example implementation or rule is essentially frequency-based. According to the first example implementation or rule of block 9-2 of FIG. 9 and FIG. 10, the scheduler is configured to allocate resources to the indoor wireless terminals in a first direction from a first edge of a resource grid and to allocate resources to the other wireless terminals in an opposite direction from an opposite edge of the resource grid. For example, as shown in FIG. 10, the scheduler 40 can be configured to allocate resources to the indoor wireless terminals in a first direction from a first carrier frequency edge of the grid and to allocate resources to the other wireless terminals in an opposite direction from an opposite carrier frequency edge of the grid.

Thus, in accordance with the first example implementation or rule, the indoor smart scheduler 40 can allocate indoor users (e.g., with highest pathloss) from the low part of the frequency domain. In a similar way, outdoor users (e.g. with low pathloss) are allocated for the high part of the frequency domain. Thereby the indoor users with high pathloss use a desirable part of the frequency band with the somewhat better propagation characteristics (if bandwidth is large). This is an additional benefit apart from the interference reduction. If this first rule is applied in every base station, indoor users will only be interfered by indoor users and outdoor users only by other outdoor users. This solution is beneficial in case the base stations are not synchronized and the time domain cannot be exploited. Note that the arrows represent the rules and there is no division of resources into groups.

An example second alternative way (e.g., second rule) of implementation the indoor smart allocation of indoor smart scheduler 40 is illustrated by block 9-3 of FIG. 9 and FIG. 11. The second example implementation or rule is essentially time-based. According to the second example implementation or rule of block 9-3 of FIG. 9 and FIG. 11, the indoor smart scheduler 40 is configured to allocate resources to the indoor wireless terminals in a first direction from a first symbol (e.g., time slot) edge of the grid and to allocate resources to the other wireless terminals in a second direction from another symbol (e.g., time slot) edge of the grid. FIG. 11 thus shows that the time domain can also be used in a similar way if the base stations are synchronized. According to this second rule, different periods in time are preferred for indoor and outdoor users respectively. The time domain is divided into shorter intervals (denoted scheduling interval) that are repeated in time. In an example implementation, for each scheduling interval, indoor users are allocated from the start, and the outdoor users are allocated from the end. In this way, the entire frequency domain can be allocated to each user. If this second rule is applied in all base stations and the same length of scheduling interval is used, then indoor users will only be interfered by indoor user and outdoor users only by other outdoor users.

An example third alternative way (e.g., third rule) of implementation the indoor smart allocation of indoor smart scheduler 40 is illustrated by block 9-4 of FIG. 9 and FIG. 12. The third example implementation or rule is essentially a hybrid frequency-based and time-based technique. According to the third example implementation or rule of block 9-4 of FIG. 9 and FIG. 12, the indoor smart scheduler 40 is configured to allocate resources to the indoor wireless terminals in a first direction from a first corner of the grid and to allocate resources to the other wireless terminals in a second direction from another corner of the grid. Thus, the third rule can start from the lower and upper corners of the 2D-radio resource domain.

The alternative implementations/rules described with reference to FIG. 9 may be combined and additional rules or techniques can be defined using the same principle to allocate indoor and outdoor users the same resources in every base station in the network.

Thus, as seen above, the indoor smart scheduler 40 can be configured to provide a first set of uplink resources to the indoor wireless terminal and a second set of resources to other wireless terminals. Yet, as indicated above, the division of resources between indoor and outdoor users need not be strict or universal, particularly in certain situations. That is, while the rules and alternative ways of implementation of the indoor smart allocation of indoor smart scheduler 40 should preferably be followed essentially as described above, there may be occasions (e.g., a predetermined circumstance) when indoor users may temporarily be permitted use of the same resources as outdoor users. For example, when only a large number of indoor users are present in a sector (and no or few outdoor users) so that the indoor users fill up all available resources, the indoor users may be (preferably temporarily) allocated resources which otherwise would be earmarked for outdoor users. The opposite could also happen, i.e., when there are many outdoor users and no or few indoor users in a sector the outdoor users may be allocated resources which otherwise would be reserved for indoor users (e.g., outdoor users in a sector may have to use the same resources as indoor users in another sector). Thus, indoor smart scheduler 40 can be configured to provide an exception to its normal rule and to allocate resources of the second set to the indoor wireless terminal or to allocate resources of the first set to the other wireless terminals upon occurrence of a predetermined circumstance. The predetermined circumstance can be, for example, the possibility that a user may be precluded from or prevented service if the indoor/outdoor rule were strictly applied. Thus, allowing some exception to a strict division of resources for up/downlink between indoor and outdoor users, as just mentioned, may preclude any undersirable blocking of users (either indoor or outdoor) in a case in which resources are not available in the normally allocated range or set. Thus, as a variation, this potential exception of resource allocation between indoor and outdoor users can apply to each of the scenarios and alternative ways described herein, including but not limited to the alternatives of FIG. 10-FIG. 12.

Figure 13:
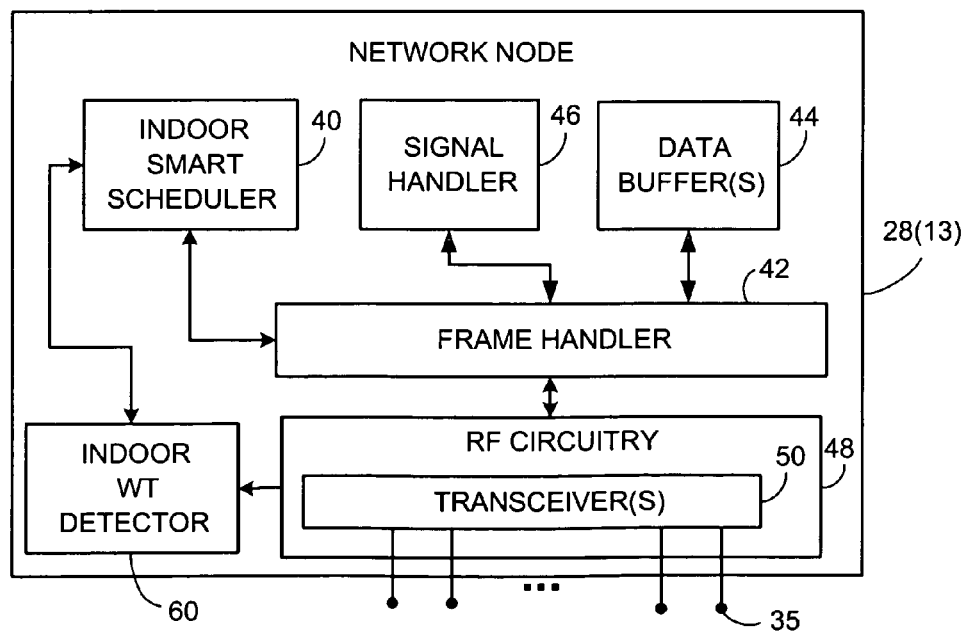
FIG. 13 is a schematic view of portions of a radio access network including a network node according to an example implementation that includes indoor wireless terminal detection.

Another and alternative aspect of the technology disclosed herein is distinguishing between indoor and outdoor users, e.g., between indoor and outdoor wireless terminals 30. To this end, FIG. 13 illustrates another embodiment of a network node, particularly network node 28(13). The network node 28(13) of FIG. 13 essentially resembles the network node 28 of FIG. 7, but additionally includes indoor wireless terminal detector 60. The indoor wireless terminal detector 60 serves to perform one or more of the techniques of detecting or discriminating whether a particular wireless terminal is an indoor wireless terminal, several non-limiting example techniques being described herein.

In accordance with an aspect of the technology disclosed herein, each active user (e.g., each wireless terminal 30) is characterized as an indoor or outdoor user, e.g., using existing radio measurements used for radio resource management functions in the base stations. Example measurements could be signal strength (path loss); signal quality (uplink and/or downlink bitrate, average bitrate, bit error rate (BER), block error rate (BLER), or channel quality indicator (CQI); power used; estimation of (travel) speed of the wireless terminal; number of reported neighbor cells; and, timing advance (distance to base station). For example, a high pathloss may indicate that the user is indoors. Moreover, a high pathloss and a low timing advance may indicate that the user is indoor close to the base station. An estimation of travel speed of the wireless terminal can be used to discrimination between outdoor and indoor location, with high speed being an indication of outdoor location. The number of neighbor cells that a wireless terminal reports to the network can be used to discriminate since few reported neighbors indicates that the user is indoor located.

A difficulty could be determining an outdoor user that is located far away from the base station. This user will have a high pathloss and a high timing advance. In this case, downlink quality measures such as bitrate and CQI can be used in this process. There is significant difference of the downlink bitrate and quality for indoor and outdoor users since the building penetration loss reduces the downlink signals as well. Since there are usually more transmissions in the downlink with internet services, downlink measurements have better statistics.

Figure 14:
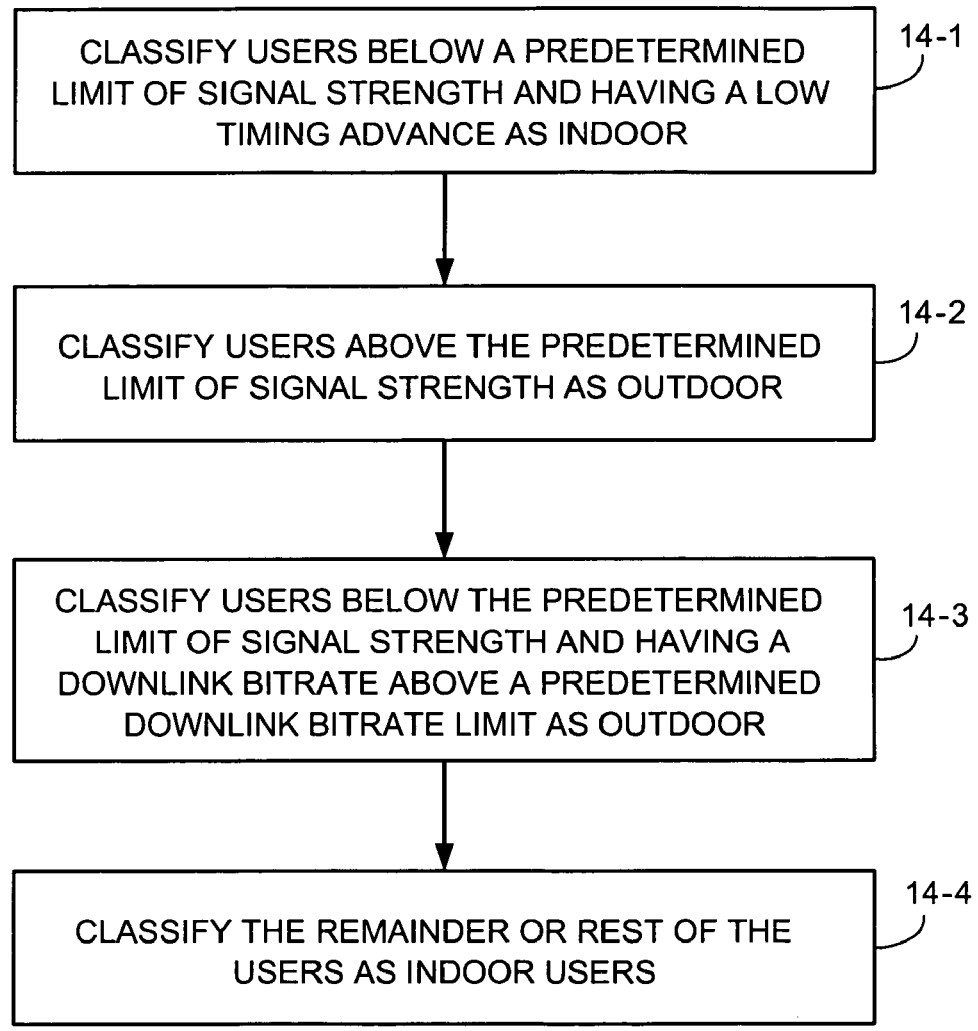
FIG. 14 is a diagrammatic view showing an example scenario of determining whether a particular wireless terminal is an indoor wireless terminal.

FIG. 14 illustrates example acts or steps included in an example method/criteria for determining whether a particular wireless terminal (e.g., user) is an indoor or outdoor wireless terminal. Act 14-1 comprises classifying users below a predetermined limit of signal strength and having a low timing advance as indoor. Act 14-2 comprises classifying users above the predetermined limit of signal strength as outdoor. Act 14-3 comprises classifying users below the predetermined limit of signal strength and having a downlink bitrate above a predetermined downlink bitrate limit as outdoor. Act 14-4 comprises classifying the remainder or rest of the users as indoor users.

The signal strength and downlink bitrate limits can be determined through experience, e.g., by performance measurements in the network. It would also be possible use a channel quality indicator (CQI), bit error rate (BER), or block error rate (BLER) instead of bitrate.

Figure 15:
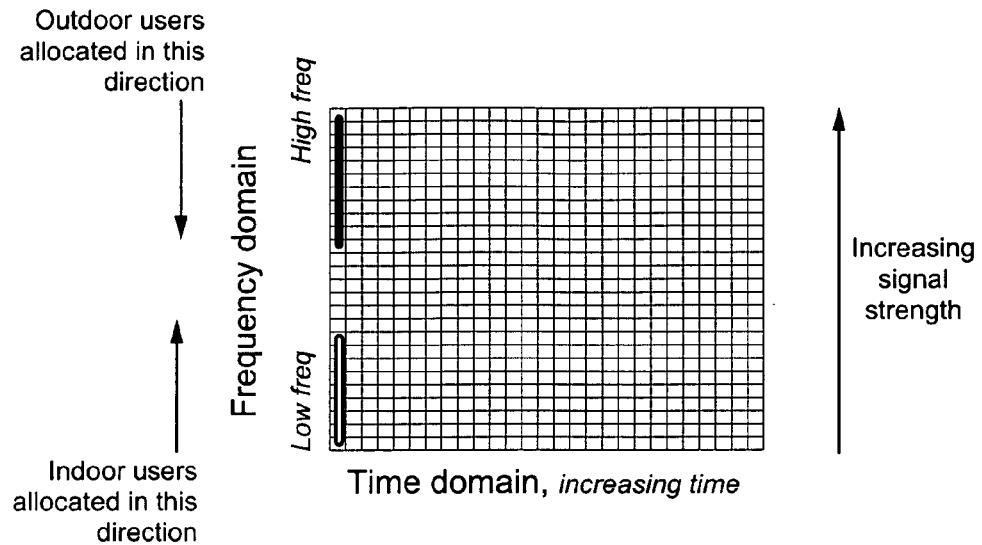
FIG. 15 is a diagrammatic view showing a resource grid and a frequency-based indoor smart resource allocation when detection of an indoor wireless terminal is based essentially on signal strength alone.

Another example and simpler method would be to detect which wireless terminals are indoor wireless terminals by only using signal strength. According to this example technique, users with low signal strength are classified as indoor and users with high signal strength are then outdoor users. In accordance with the first rule illustrated by FIG. 10, indoor smart scheduler 40 can allocate resources from lowest frequencies to the user with lowest signal strength and resources from the highest frequencies to the user with highest signal strength, in the manner shown in FIG. 15.

Figure 16:
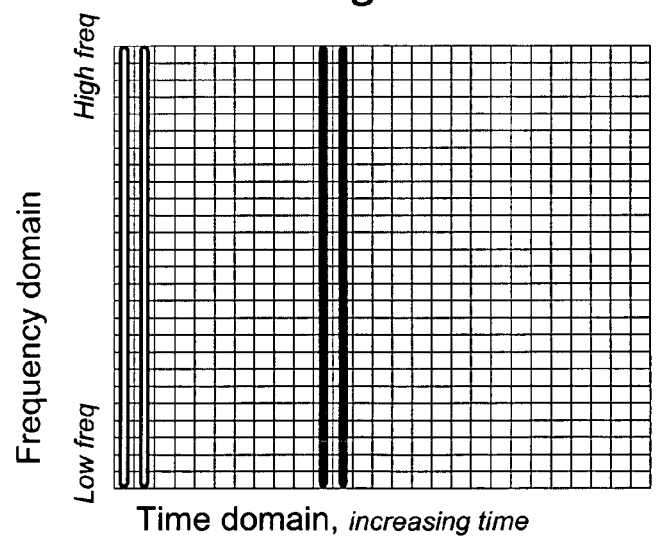
FIG. 16 is a diagrammatic view showing a resource grid and a time-based indoor smart resource allocation when detection of an indoor wireless terminal is based essentially on signal strength alone.
Figure 16:
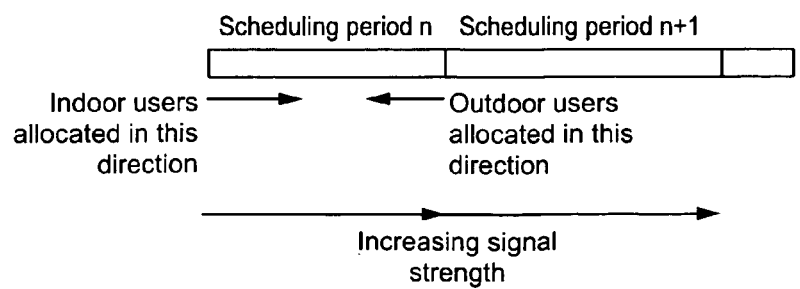

The technique of detecting indoor wireless terminals based essentially on signal strength alone can also be employed in conjunction with the second rule illustrated by FIG. 11, e.g., allocating resources in the beginning of the scheduling period to the user with lowest pathloss. The end of the scheduling period is allocated to the user with highest signal strength. FIG. 16 thus shows a resource grid and a time-based indoor smart resource allocation when detection of an indoor wireless terminal is based essentially on signal strength alone.

Figure 17:
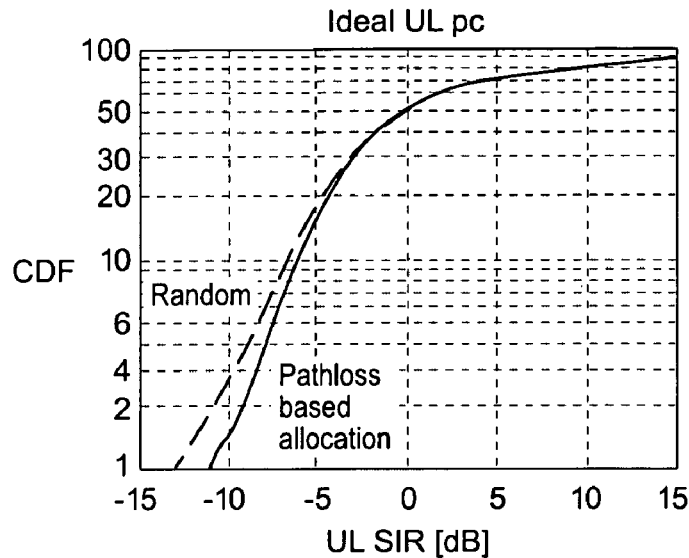
FIG. 17 is a graphical view showing two graphs that demonstrate radio network simulations involving an example indoor smart scheduler.
Figure 17:
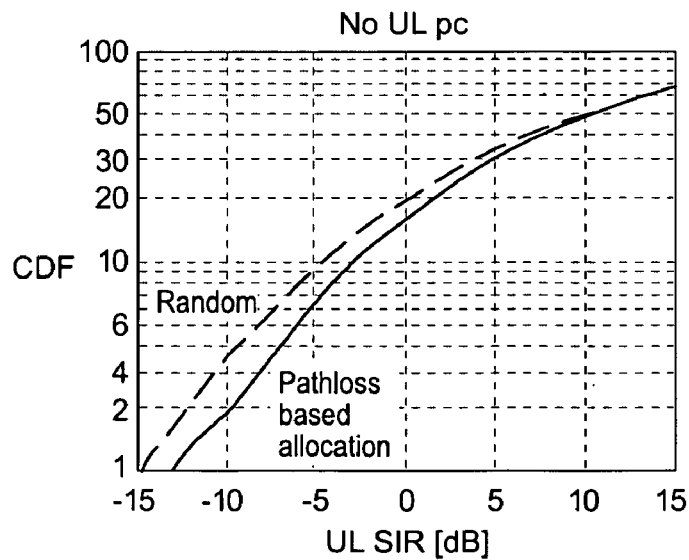

Radio network simulations have been performed to quantify the gains with scheduler solution over a random allocation scheduler. The uplink SIR (signal to interference ratio) was measured and a gain of 1-5 dB was seen for the worst indoor users depending on the scenario. This SIR gain can be traded for increased uplink bitrate. The uplink bitrate gain is 25 to 125%, i.e., up to more than double bitrates for the worst indoor users. An overview of the results and some assumptions are shown in FIG. 17. In FIG. 17, the uplink (UL) SIR (signal to interference ratio) in decibels (dB) is depicted as UL SIR [dB] along the X axis, while the Y axis (labeled as CDF) shows the Cumulative Distribution Function percent, e.g., shows a population which has a UL SIR less than a specific level.

The technology disclosed herein described herein has numerous advantages. For example, the technology disclosed herein requires essentially no extra hardware. Moreover, the technology disclosed herein does not require any changes to existing radio telecommunication standards. The scheduling rules can be global and, at least in some embodiments, no communication between base stations are needed. Time domain scheduling requires network synchronization while frequency domain rules can always be used.

It should be understood that elements of network node 28, particularly including indoor smart scheduler 40 and/or indoor wireless terminal detector 60, can be realized by one or more controllers and/or one or more processor(s) as those terms are herein expansively elaborated. Accordingly, in at least some example embodiments the indoor smart scheduler 40 and indoor wireless terminal detector 60 can be realized by units which execute instructions stored on tangible or electronic media, e.g., stored in one or more memory elements of various types.

Although the description above contains many specificities, these should not be construed as limiting the scope of the invention but as merely providing illustrations of some of the presently preferred embodiments of this invention. Thus the scope of this invention should be determined by the appended claims and their legal equivalents. Therefore, it will be appreciated that the scope of the present invention fully encompasses other embodiments which may become obvious to those skilled in the art, and that the scope of the present invention is accordingly to be limited by nothing other than the appended claims, in which reference to an element in the singular is not intended to mean "one and only one" unless explicitly so stated, but rather "one or more." All structural, chemical, and functional equivalents to the elements of the above-described preferred embodiment that are known to those of ordinary skill in the art are expressly incorporated herein by reference and are intended to be encompassed by the present claims. Moreover, it is not necessary for a device or method to address each and every problem sought to be solved by the present invention, for it to be encompassed by the present claims. Furthermore, no element, component, or method step in the present disclosure is intended to be dedicated to the public regardless of whether the element, component, or method step is explicitly recited in the claims. No claim element herein is to be construed under the provisions of 35 U.S.C. 112, sixth paragraph, unless the element is expressly recited using the phrase "means for."

What is claimed is:

1. A network node of a radio access network which comprises a scheduler configured to provide an allocation of an uplink resource to an indoor wireless terminal for communications over an air interface with the network node, the allocation by the network node being in a coordinated manner with the resource allocation of another network node whereby any interference by reason of allocation of the same uplink resource must be with another indoor wireless terminal served by the another network node;

wherein with respect to a scheduling period the scheduler is configured to provide an allocation of at least one resource block(s) of a resource grid of time-frequency resources for uplink transmission from the wireless terminal to the network node over the radio interface; and wherein the scheduler is further configured to allocate a first portion of the grid to indoor wireless terminals and a second portion of the grid to other wireless terminals.

2. The node of claim 1, further comprising at least one transceiver for performing communication between the network node and the wireless terminal.

3. The node of claim 1, wherein the another network node is a network node whihech serves a neighboring or adjacent cell.

4. The node of claim 1, wherein the scheduler is configured to provide a first set of uplink resources to one or more indoor wireless terminals and a second set of resources to other wireless terminals.

5. The node of claim 4, wherein scheduler is configured to allocate resources of the second set to one or more indoor wireless terminals or to allocate resources of the first set to the other wireless terminals upon occurrence of a predetermined circumstance.

6. The node of claim 4, wherein the first set of resources comprises a first frequency carrier and the second set of resources comprises a second frequency carrier.

7. The node of claim 1, wherein the scheduler is configured to allocate resources to the indoor wireless terminals in a first direction from a first edge of the grid and to allocate resources to the other wireless terminals in an opposite direction from an opposite edge of the grid.

8. The node of claim 1, wherein the scheduler is configured to allocate resources to the indoor wireless terminals in a first direction from a first carrier frequency edge of the grid and to allocate resources to the other wireless terminals in an opposite direction from an opposite carrier frequency edge of the grid.

9. The node of claim 1, wherein the scheduler is configured to allocate resources to the indoor wireless terminals in a first direction from a first symbol edge of the grid and to allocate resources to the other wireless terminals in a second direction from another symbol edge of the grid.

10. The node of claim 8, wherein the scheduler is configured to allocate resources to the indoor wireless terminals in a first direction from a first corner of the grid and to allocate resources to the other wireless terminals in a second direction from another corner of the grid.

11. The node of claim 1, further comprising a detector configured to determine whether a specified wireless terminal in communication over an air interface with the network node is an indoor wireless terminal.

12. The node of claim 1, further comprising a detector configured to determine whether a specified wireless terminal in communication over an air interface with the network node is an indoor wireless terminal based on at least one of (1) velocity of the wireless terminal; and (2) a number of neighbor cells that the wireless terminal reports to the network.

13. The node of claim 11, wherein the detector is configured to use radio measurements to determine whether the specified wireless terminal is the indoor wireless terminal.

14. The node of claim 13, wherein the detector is configured to use at least one of signal strength, timing advance, and downlink bitrate to determine whether the specified wireless terminal is the indoor wireless terminal.

15. A method of operating a network node comprising:
allocating an uplink resource to an indoor wireless terminal in communication over an air interface with the network node in a coordinated manner with the resource allocation of another network node whereby any interference by reason of allocation of the same uplink resource must be with another indoor wireless terminal served by the another network node;
receiving an uplink transmission from the indoor wireless terminal on the uplink resource; and
allocating at least one resource block(s) of a scheduling period of a resource grid of time-frequency resources for uplink transmission from the wireless terminal to the network node over the radio interface;
wherein a first portion of the grid is allocated to indoor wireless terminals and a second portion of the grid is allocated to other wireless terminals.

16. The method of claim 15, further comprising providing a first set of uplink resources for one or more indoor wireless terminals and a second set of resources for other wireless terminals.

17. The method of claim 16, further comprising allocating resources of the second set to one or more indoor wireless terminals or allocating resources of the first set to the other wireless terminals upon occurrence of a predetermined circumstance.

18. The method of claim 16, wherein the first set of resources comprises a first carrier and the second set of resources comprises a second carrier.

19. The method of claim 15, further comprising allocating resources to the indoor wireless terminals in a first direction from a first edge of the grid and allocating resources to the other wireless terminals in an opposite direction from an opposite edge of the grid.

20. The method of claim 15, further comprising allocating resources to the indoor wireless terminals in a first direction from a first carrier frequency edge of the grid and to allocate resources to the other wireless terminals in an opposite direction from an opposite carrier frequency edge of the grid.

21. The method of claim 15, further comprising allocating resources to the indoor wireless terminals in a first direction from a first symbol edge of the grid and allocating resources to the other wireless terminals in a second direction from another symbol edge of the grid.

22. The method of claim 15, further comprising allocating the resources to the indoor wireless terminals in a first direction from a first corner of the grid and to allocate resources to the other wireless terminals in a second direction from another corner of the grid.

23. The method of claim 15, further comprising determining whether a specified wireless terminal in communication over an air interface with the network node is an indoor wireless terminal.

24. The method of claim 15, further comprising determining whether a specified wireless terminal in communication over an air interface with the network node is an indoor wireless terminal based on at least one of (1) velocity of the wireless terminal;
and (2) a number of neighbor cells that the wireless terminal reports to the network.

25. The method of claim 23, further comprising using radio measurements to determine whether the specified wireless terminal is the indoor wireless terminal.

26. The method of claim 25, further comprising using at least one of signal strength, timing advance, and downlink bitrate to determine whether the specified wireless terminal is the indoor wireless terminal.

27. A method of operating a radio access network comprising a first network node and a second network node, the method comprising:
the first network node allocating an uplink resource to a first indoor wireless terminal in communication over an air interface with the radio access network;
the second network node ensuring that a second wireless terminal is also an indoor wireless terminal before allocating a same uplink resource to the second wireless terminal as did the first network node to the first wireless terminal; and
each node allocating at least one resource block(s) of a scheduling period of a resource grid of time-frequency resources for uplink transmission from a wireless terminal to the network node over the radio interface;
wherein a first portion of the grid is allocated to indoor wireless terminals and a second portion of the grid is allocated to other wireless terminals.

28. A method of operating a radio access network comprising a first network node and a second network node, the method comprising:

both the first network node and the second network node making allocations of uplink resources whereby wireless terminals which are indoor wireless terminals are assigned uplink resources which are in a first portion of a frequency-time grid;

both the first network node and the second network node making allocations of uplink resources whereby wireless terminals which are not indoor wireless terminals are assigned uplink resources which are in a second portion of a frequency-time grid;

the allocations requiring that any interference experienced by an indoor wireless terminal by reason of allocation of same uplink resource be with another indoor wireless terminal.

* * * * *